3,328,366
POLYMERIZATION OF ETHYLENE AND AN ALPHA-OLEFIN IN THE PRESENCE OF AN ALKYL ALUMINUM HALIDE, A VANADIUM COMPOUND AND AN ORGANIC COMPOUND CONTAINING SULFUR, OXYGEN AND A HALOGEN
Kohei Nakaguchi, Masaaki Hirooka, and Toshimichi Fujita, Niihama-shi, Japan, assignors to Sumitomo Chemical Company, Ltd., Osaka, Japan, a corporation of Japan
No Drawing. Filed May 20, 1964, Ser. No. 368,980
Claims priority, application Japan, May 23, 1963,
38/27,025, 38/27,026
15 Claims. (Cl. 260—88.2)

This invention relates to a method for polymerizing ethylene or a mixture of ethylene and an alpha-olefin and to a catalytic composition therefor. More particularly this invention relates to a method for producing polyethylene or copolymers of ethylene and an alpha-olefin having an extremely narrow range of molecular weight distribution, and to a catalytic composition useful for such purpose.

There have been known many attempts hitherto for the polymerization of ethylene or a mixture of ethylene and an alpha-olefin. Especially, since the discovery of the Ziegler catalyst, many useful polymerization methods using such catalysts at a low pressure have been proposed. Among these, combinations of a compound of a transition metal lying in the 4th to 6th group of Mendeleev's periodic table with a reducing agent are most conventional. As to the reducing agent trialkylaluminum, dialkylaluminum monohalide, organo-metallic compounds of Zn or Mg, metals of the 1st to 3rd group or their hydrides, alkyllead or many others have been disclosed. However, effective compounds among the transition metal compounds of the 4th to 6th groups of Mendeleev's periodic table are, in reality, limitative and the ones practically valuable are those of titanium or vanadium. Especially halogen compounds of these metals have been used effectively. For the manufacture of crystalline polyethylene or of other poly-alpha-olefin, titanium halides are suitable and vanadium compounds have been considered to be inferior to titanium halides. In general, vanadium compounds are expensive and less active than titanium compounds. Contrarily, they are suitable for the manufacture of non-crystalline polymers such as amorphous copolymers of ethylene-propylene. Combinations of one of these compounds with an alkylaluminum compound containing or not containing halogen atom are most popular among this type of catalyst.

As the Ziegler type catalyst contains, as its constituents, metal compounds, it is a problem for polymers produced to be freed from the catalyst constituents. The lowering of electric resistance, and stability against thermal oxidation, coloring and others, are troubles frequently encountered in the handling of these polymers. Even an exceedingly slight amount of the transition metal compound remaining in the polymer is known to bring about undesirable effect. To solve this problem, it is necessary to eliminate the catalyst constituents completely from the produced polymer, but there is a limit to the elimination operation of the constituents. On the other hand, it can be considered that, if the amount of the catalyst against the monomer can be reduced to a very low level without decreasing the polymerization velocity, the problem will also be solved. Accordingly, it is desirable to increase the yield of polymer per unit amount of catalyst. However, even in the combination of triethylaluminum with titanium tetrachloride which has been regarded as one of the best catalyst systems in the polymerization characteristic, the lowering of catalyst amount incurs the reduction of activity, and when the concentration of the catalyst is lowered over a certain limit, the polymer cannot be produced practically. Accordingly, it is obvious that there is a limit in the polymerization activity per unit amount of catalyst in the conventional catalyst systems.

It is an object of the present invention to provide a method for the polymerization of ethylene or a mixture of ethylene and an alpha-olefin by use of a catalyst composition which has a polymerization activity much superior to any other catalyst systems ever known. It is another object of the present invention to provide a method in which the amount of catalyst constituents especially the constituent of the transition metal compound included in the resulting polymer is reduced to an extremely small amount due to the use of a catalyst having a remarkably superior polymerization activity. A further object of the present invention is to provide a method by which a polymer having a molecular weight distribution much narrower than any other polyethylene ever produced by the conventional Ziegler type catalysts can be practically produced. Polyethylenes produced by such Ziegler type catalysts have wide molecular weight distributions. As individual polyethylene molecules are linear polymers having almost no branch, they are readily crystallizable and have high specific gravities. This type of polymer has disadvantages of being less resistant against stress cracking and inferior in impact strength and toughness at a low temperature as compared with polyethylenes produced by high pressure method which have many branchings and lower specific gravities. Still, a further object of the present invention is to provide a method which affords a polymer superior in these characteristic properties. Superiority of these properties seems to be dependant to some extent on the narrow distribution of molecular weight. A still further object of the present invention is to provide a method which affords a homogeneous amorphous copolymer having narrow molecular weight distribution by use of a relatively large amount of an alpha-olefin along with ethylene. Yet a still further object of the present invention is to provide a catalyst system which enables to perform the foregoing method. Other objects and advantages of the invention will become apparent to those skilled in the art upon consideration of the accompanying disclosure.

To accomplish these objects the present invention provides a method for producing polyethylene or copolymers of ethylene and an alpha-olefin which comprises contacting ethylene or a mixture of ethylene and an alpha-olefin having the general formula of $RCH=CH_2$, wherein R is a member selected from the group consisting of alkyl, aryl, aralkyl, alkylaryl, and cycloalkyl radicals having carbon atoms of from 1 to 20, with a catalytic system obtained by admixing (A) at least one organoaluminum compound containing at least one halogen atom whose composition is represented by the general formula $$AlR'_mX_{3-m}$$

wherein R' is a member selected from the group consisting of alkyl, aryl, aralkyl, alkylaryl, and cycloalkyl radicals having carbon atoms of from 1 to 20, X is a halogen atom and m is a number of from 1 to 2, (B) a compound of the general formula of $R''SO_nY$, wherein R'' is a member selected from the group consisting of halogen atoms hydroxyl radical and hydrocarbon radicals of alkyl, aryl, aralkyl, alkylaryl and cycloalkyl radicals having carbon atoms of from 1 to 20, and their derivatives, Y is a halogen atom and n is an integer selected from 1 and 2, and (C) a vanadium compound.

Of the catalyst constituents in the present invention, the organoaluminum compound containing at least one halogen atom and the vanadium compound have been considered generally by those skilled in the art to be inferior to trialkylaluminum and titanium compound respectively in polymerization activity. It is common knowledge that the sulfur compounds, in general, act as a polymerization inhibitor to the conventional Ziegler type catalysts. For example, according to K. Vesely et al., J. Polymer Sci. 55, 25 (1961), sulfur compounds such as thiocarbonyl, carbon disulfide, dimethyl thioether, methyl mercaptane, hydrogen sulfide or the like show distinct retarding effect against the polymerization of propylene using triethylaluminum and titanium trichloride catalyst even when the addition of these sulfur compounds is in an exceedingly slight amount. In U.S. Patent No. 2,996,459 and U.S. Patent No. 3,009,908 relating to polymerization of ethylene, it is taught that the activity of the Ziegler type catalyst is lowered when alkyl mercaptane or thiophenol is added thereto. There are also many other literature references concerning the polymerization inhibitive action of sulfur compounds. It is unexpectable and surprising that the inventors of the present invention have discovered that the polymerization activity of the present catalyst system containing a sulfur compound of the general formula $R''SO_nY$ is remarkably higher than that of the catalyst system lacking such a compound. It is especially interesting that the amount of such a sulfur compound added is not slight as is in the foregoing literature, but is sufficiently large to show superior polymerization activity. Further it is notable that the present catalyst system shows superior polymerization activity by use of only a very small amount of the transition metal constituent. This is one of the advantageous characteristics of the present invention which could not be attained by the catalytic system using the conventional titanium compound. On account of this, the amount of catalyst constituents, especially the transition metal constituent, included in the resulting polymer approach an almost unrecognizable amount. Thus, some of the above mentioned drawbacks in the polyethylene manufacture by use of the Ziegler type catalyst have been eliminated.

This feature of the present method will be more apparent when the experimental results of ethylene polymerization by use of the present catalyst system are compared with those of the conventional catalyst systems. Table I shows examples of such comparison. From these results, it is apparent that in the catalyst system of triethylaluminum and titanium tetrachloride, a concentration of titanium tetrachloride lower than 0.1 mmol/l. does not produce a practical amount of polymer even in the presence of a sufficient amount of triethylaluminum, but in the present catalytic system, even such a small amount of vanadium tetrachloride as $3 \times 10^{-4}$ mmol/l. shows superior polymerization activity. As is explained hereinafter, even at much lower concentration, it is possible to produce polyethylene.

Another advantageous feature of the catalyst of the present invention is that the catalyst can be brought into a homogeneous state or a finely dispersed state very close to the homogeneous state. When the catalyst is in a concentrated state, it exists generally in a heterogeneous state, but at the concentration used in the actual polymerization system, it can be practically handled as a homogeneous system. Such a finely dispersed state of the catalyst seems to be the factor of high activity of the present catalyst. The fact that the catalyst is in a highly homogeneous dispersed state, is not only very effective in increasing the polymer yield per unit amount of catalyst but is, needless to say, very advantageous in the operation from the technical point of view. As for catalyst systems which are in a homogeneous state or a state close to this state, some unusual catalyst systems which give an extremely high polymer yield per unit amount of transition metal element are known. Among such are those described by W. L. Carrick et al., such as the tetraphenyltin - aluminum tribromide - vanadium halide system disclosed in J. Am. Chem. Soc. 82, 3883 (1960) and the trialkylaluminum - aluminum trihalide - vanadium halide system disclosed in J. Am. Chem. Soc. 80, 6455 (1958). These series of catalyst systems developed by Carrick et al. have something in common with the present catalyst in the points that the necessary amount of vanadium halide is very small and the molecular weight distribution of the resulting polymer is narrow. However all of these Carrick catalyst systems have a disadvantage in the point that they use an aluminum halide. For example, since aluminum trichloride is almost insoluble in common hydrocarbon solvents, it is difficult to utilize the mixed catalyst constituents completely. Though aluminum tribromide is readily soluble in hydrocarbon solvents, it is liable to decompose, is difficult to handle and, moreover, is expensive and inferior in activity. Besides, tetraphenyltin is solid and inconvenient in handling, such as dissolution and the like. On the other hand, all of the catalyst constituents used in the present invention are liquid and readily soluble in hydrocarbon solvent. Accordingly they are not only convenient in handling but also they have an advantage, among others, in the point that all of the constituents can be utilized effectively. From the economical point of view also, the present catalyst system can be said to be superior. Still more, the present catalyst system has exceedingly large activity and even at a low temperature, such as lower than 0° C., it maintains its superior activity.

The following fact is also noteworthy as a characteristic property of the present catalyst. That is the fact that the catalyst constituents are extremely limitative. In other words, it is only when an organoaluminum compound TABLE I.—POLYMERIZATION OF ETHYLENE WITH VARIOUS CATALYST SYSTEMS
[Polymerization temperature: 25° C.; pressure: atmospheric pressure; solvent: n-heptane]

| Number | Catalyst system (mmol./l.) | | | Mean polymerization rate, g. polymer/ mmol B/hr. |
| --- | --- | --- | --- | --- |
| | A | B | C | |
| 1 | AlEt$_3$ (20) | TiCl$_4$ (1.6) | | 250 |
| 2 | AlEt$_3$ (20) | TiCl$_4$ (0.1) | | 15 |
| 3 | AlEt$_3$ (20) | TiCl$_4$ (0.02) | | 0 |
| 4 | AlEt$_3$ (20) | TiCl$_4$ (0.04) | C$_6$H$_5$—SO$_2$Cl (2.0) | 0 |
| 5 | AlEtCl$_2$ (20) | TiCl$_4$ (3.2) | | 0 |
| 6 | AlEtCl$_2$ (20) | TiCl$_4$ (1.6) | C$_6$H$_5$—SO$_2$Cl (80) | 0 |
| 7 | AlEtCl$_2$ (10) | VCl$_4$ (0.00032) | C$_6$H$_5$—SO$_2$Cl (10) | 73,400 |
| 8 | AlEtCl$_2$ (10) | VOCl$_3$ (0.008) | C$_6$H$_5$—SO$_2$Cl (0.4) | 7,500 | containing at least one halogen atom, vanadium compound and a compound having a general formula of $$R''SO_nY$$

wherein $R''$, $n$ and $Y$ have the same meanings as identified above, are combined, that the superior polymerization activity of the present invention appears. For example, when an organoaluminum compound does not contain halogen, or when a transition metal compound other than vanadium is used, the addition of the compound having a general formula of $R''SO_nY$ is not only useless but rather harmful. This relation is more apparent by referring to the following experimental results shown in Table II.

TABLE II.—EXPERIMENTAL RESULTS SHOWING THE CHARACTERISTIC PROPERTIES OF THE PRESENT METHOD ETHYLENE-PROPYLENE COPOLYMER

[Solvent: n-heptane; temperature: 25° C.; pressure: atmospheric pressure polymerization time: 10 minutes]

| Catalyst system | Relative polymerization rate [1] |
|---|---|
| AlEtCl$_2$—VOCl$_3$ (control) | 100 |
| AlEtCl$_2$—VOCl$_3$—C$_6$H$_4$—SO$_2$Cl | 750 |
| AlEtCl$_2$—VOCl$_3$—SO$_2$Cl$_2$ | 1,390 |
| AlEtCl$_2$—VOCl$_3$—(CH$_3$)$_2$SO | 64 |
| AlEtCl$_2$—VOCl$_3$—CH$_3$COCl | 37 |
| AlEtCl$_2$—TiCl$_4$—C$_6$H$_4$—SO$_2$Cl | 0 |
| AlEt$_3$—VOCl$_3$ (control) | 100 |
| AlEt$_3$—VOCl$_3$—C$_6$H$_4$—SO$_2$Cl | 18 |

[1] Relative polymerization rates are expressed by the relative value to control (100).

The present invention is concerned with a method for the polymerization of ethylene or a mixture of ethylene and an alpha-olefin. Alpha-olefin used here has the general formula $RCH=CH_2$ wherein R is a member selected from the group consisting of alkyl, aryl, aralkyl, alkylaryl, and cycloalkyl radicals having from 1 to 20 carbon atoms, and includes, e.g., propylene, butene-1, pentene-1, hexene-1, heptene-1, octene-1, 3-methylbutene-1, 4-methylpentene-1, 4 - methylhexene - 1, 4-phenylbutene-1, styrene, p - methylstyrene, vinylcyclopentane, vinylcyclohexane, and the like. Among these, propylene, butene-1 and styrene are most frequently used.

The organoaluminum compound containing a least one halogen atom used in the present method is a single compound or a mixture of compounds whose composition is represented by the general formula $AlR'_mX_{3-m}$ wherein $R'$ is a member selected from the group consisting of alkyl, aryl, aralkyl, alkylaryl, and cycloalkyl radicals having from 1 to 20 carbon atoms, X is a halogen atom and $m$ is a number of from 1 to 2, and includes, e.g., ethylaluminum dichloride, isopropylaluminum dichloride, n-hexylaluminum dichloride, phenylaluminum dichloride, cyclohexylaluminum dichloride, cyclopentadienylaluminum dichloride, ethylaluminum dibromide, ethylaluminum diiodide, p-chlorophenylaluminum dichloride, ethylaluminum sesquichloride, phenylaluminum sesquichloride, tolylaluminum sesquibromide, diethylaluminum chloride, di-n-butylaluminum iodide, diphenylaluminum chloride, dicyclopentadienylaluminum chloride, or a mixture of the foregoing compounds.

The compound having the general formula of $R''SO_nY$ wherein $R''$ is a member selected from the group consisting of halogen atoms, hydroxyl radical and hydrocarbon radicals of alkyl, aryl, aralkyl, alkylaryl, and cycloalkyl radicals having from 1 to 20 carbon atoms, and their derivatives, Y is a halogen atom such as chlorine, bromine and iodine and $n$ is an integer selected from 1 and 2, includes, e.g., benzenesulfonyl chloride, benzenesulfinyl, chloride, benzenesulfonyl bromide, benzenesulfonyl iodide, o-toluenesulfonyl chloride, m-xylenesulfonyl chloride-(4), benzylsulfonyl chloride, α-naphthalenesulfonyl chloride, p-chlorobenzenesulfonyl chloride, m-chlorobenzenesulfonyl chloride, p-bromobenzenesulfonyl chloride, p-nitrobenzenesulfonyl chloride, p-aminobenzenesulfonyl chloride, 2-aminotoluenesulfonyl chloride-(4), 4-aminophenolsulfonyl chloride, β-naphthylamine - (1) - sulfonyl chloride-(5), naphthol-(2)-disulfonyl chloride-(3,6), 1,2, dioxyanthraquinonesulfonyl chloride-(7), cyclohexanesulfonyl chloride, methylcyclohexanesulfonyl chloride, propanesulfonyl chloride, ethane sulfonyl chloride, chloroethanesulfonyl chloride, sulfuryl chloride, thionyl chloride, thionyl bromide, chlorosulfonic acid and the like.

As for the vanadium compound used in the present invention, those such as halogen compounds, alcoholates, acetylacetonates salicylates, cyclopentodienyl compounds and the like can be illustrated, though there is no limitation in the binding mode of the vanadium compound. For example, vanadium tetrachloride, vanadyl trichloride, vanadyl dichloride, vanadium triacetylacetonate, chlorovanadyl acetylacetonate, dichlorovanadyl monoacetylacetonate, dicyclopentadienylvanadium dichloride, triethyl orthovanadate, di-n-butyl monochloro - ortho - vanadate, ethyl dichloro-ortho-vanadate, n-butyl dichloro-ortho-vanadate, n-hexyl dichloro-ortho-vanadate, cyclohexyl dichloro-ortho-vanadate, vanadium tetrabromide, vanadium tetraiodide, vanadyl tribromide, vanadyl triiodide, dibromovanadyl monoacetylacetonate, dimethyl monobromo-ortho-vanadate, dichlorovanadyl salicylate and the like, can be illustrated as a compound useful for the present invention.

As for the concentration of an organoaluminum compound containing at least one halogen atom in the reaction medium, there is no special limit, but a concentration lower than a certain value is not preferable because it brings about the reduction of polymerization rate. In general, it is preferable to use a concentration higher than 0.1 mmol/l., preferably from 1 to 20 mmol/l. It doesn't matter if the addition amount exceeds this range.

As for the compound having the general formula of $R''SO_nY$, it contributes polymerization reaction even when a relatively small amount is added. Accordingly it is not necessary to add a too large amount. In general, a compound having the general formula of $R''SO_nY$ is used in an amount of 0.001 to 20 mol per mol of an organoaluminum compound containing at least one halogen atom. Especially when it is used in an amount close to equivalent value, most excellent effects can be expected. Such an effect as this is in striking contrast to that of sulfur compounds described in the known literatures which act preventatively to polymerization even in a slight amount.

As for the third constituent of the catalyst, the vanadium compound, it can afford polymerization activity even in a slight amount. Even at such a low concentration in a reaction medium as from $10^{-6}$ to $10^{-2}$ mmol/l., it affords superior polymerization activity. In general, a concentration ranging from $10^{-4}$ to $10^{-1}$ mmol./l. is preferred. It is of course possible to use a concentration of from 1 to 10 mmol/l., which is the common range in the case of the conventional Ziegler type catalyst. As for the preferable range expressed by the proportion to an organoaluminum compound containing at least one halogen atom, a proportion ranging from $10^{-6}$ to $10^{-1}$ mol/mol is suitable. Needless to say, it is possible to use other proportions.

As apparent from the foregoing disclosure, the organoaluminum compound containing at least one halogen atom and the compound having the general formula of $R''SO_nY$ are the main constituents in the catalytic system and the vanadium compound is sufficient in only a small amount.

This is quite different from the conventional Ziegler type catalyst which has maximum activity where the mole ratio of the aluminum compound vs. the transistion metal compound is in the neighborhood of 1 to 2. This is suggestive of a substantial difference in character between the present catalyst system and the Ziegler type catalyst system.

In preparing the catalyst, the order of addition of catalyst constituents does not have substantial effect. This is especially so when the catalyst constituents are pretreated by mixing them at a concentrated state and introduced into the reaction system. However, the polymerization activity is generally superior when the catalyst constituents are separately introduced into the reaction system. Generally speaking, the procedure in which the compound having the general formula of $R''SO_nY$ is brought to contact with the organoaluminum compound containing at least one halogen atom in advance seems to afford better results than the procedure in which the $R''SO_nY$ type compound is admixed firstly with the vanadium compound.

In the polymerization method according to the present invention, the catalyst loses its polymerization activity sometimes in a relatively short time. Accordingly, the polymerization may be finished before sufficient amount of polymer per solvent is produced, depending upon the condition. In such a system, the procedures by which the catalyst constituents, especially vanadium constituent, are added either continuously or gradually at some divided interval are advantageous. By these procedures it is possible to raise the yield of polymer per unit volume of solvent while utilizing the catalyst effectively.

In carrying out the present invention, the pressure of the ethylene or of the mixture of ethylene and an alpha-olefin, may be chosen optionally. Generally speaking, the reaction is violent, even at atmospheric pressure in readily yielding the polymer since the activity of the present catalyst system is remarkably high. If required, it is possible to perform polymerization the reaction of effectively even at a reduced pressure or in the state diluted with an inert gas. Needless to say, the polymerization reaction may be performed at an elevated pressure if such operation is required. However, the polymerization at the atmospheric pressure seems to be advantageous from the point of apparatus and operation. In general, the partial pressure of the monomer in the reaction system has a close relation not only to the rate of polymerization but also to the mean molecular weight of resulting polymer and in this regard it is an important factor.

When the partial pressure of the monomer, e.g. ethylene, is low, the molecular weight of resulting polymer is reduced and the polymer tends to resemble a homogeneously and well dispersed state of particles. It is necessary to pay due attention not to make the partial pressure of the monomer, e.g. ethylene, too high. When it is too high it is liable to cause local heat accumulation due to excessively increased rate of polymerization and to form frequently large lumps of polymer. In order to reduce the partial pressure of the monomer, dilution by use of an inert gas such as nitrogen, argon, helium, carbon dioxide, methane, ethane, propane, butane and the like or use of a solvent having low solubility of monomer is preferred. Other procedures e.g. such as operation at a reduced pressure or the like can, of course, be taken.

The molecular weight of the resulting polymer also depends upon other polymerization conditions such as temperature, concentration of catalyst and the like. The higher the polymerization temperature is, and the greater the catalyst concentration, especially the concentration of vanadium compound, is, the greater the reduction of molecular weight of resulting polymer is. The catalyst constitution has also some effect. In general the compound having the general formula of $R''SO_nY$ reduces the molecular weight when it is used in an amount relatively greater than the other constituents. When the concentration of alpha-olefin is large compared with that of ethylene, the molecular weight becomes low. When alpha-olefin alone is used, a polymer of very low molecular weight is generally produced. For example, in the case of propylene, liquid or semi-solid polymer is produced.

It is posible to use other molecular weight controllers. For example, by the addition of hydrogen gas, a polymer having a controlled molecular weight can be produced. Hydrogen gas can be used in an amount ranging from a few percent to more than 100 percent per amount of monomer. It is possible to use hydrogen gas up to 95 mol percent per total mixture. When the reaction system is diluted with a large amount of hydrogen, the dispersed state of polymer becomes excellent.

As for polymerization temperature, it is possible to select an arbitrary temperature from such a low temperature as $-100°$ C. to a relatively high temperature of $+150°$ C. In general, a temperature of from $-78°$ C. to $70°$ C. especially a temperature, in the neighborhood of room temperature is most commonly used. When the temperatures is high, the reduction of activity proceeds rapidly. On this account, effective polymerization is generally performed at a lower temperature than the case of the conventional Ziegler type catalyst. The low temperature is favorable for producing a polymer of high molecular weight effectively in a system of high monomer concentration.

In carrying out the present method, it is favorable to use an inert medium for the purpose of dispersing the catalyst and the product polymer and of removing the reaction heat. As such a medium, a hydrocarbon or a halogenated hydrocarbon is suitable. For example, ethane, propane, butane, pentane, hexane, heptane, octain, nonane, ligroin, petroleum ether or other petroleum mixed solvent, benzene, toluene, xylene, cyclohexane, methylcyclohexane, monochlorobenzene, dichlorobenzene, carbon tetrachloride, chloroform, dichloroethylene, dichloroethane, trichloroethane, trichloroethylene, tetrachloroethane, tetrachloroethylene, hexachloroethane, ethylchloride, butylchloride, dibromoethane, bromobenzene and the like can be illustrated.

On the other hand, polar solvents containing oxygen, nitrogen or other hetero atom are not suitable. For example tetrahydrofuran, ethyl ether, dioxane, dimethylformamide, ethyl acetate and the like make the catalyst extremely inactive or it products practically no polymer.

The catalyst system of the present invention has mostly a good dispersive property. Except in the case of solvents capable of dissolving polymers, it frequently happens that the present catalyst system brings polymers into a swollen state or into a colloidally dispersed state close to a swollen state. In such a state, the diffusion of the monomer into a polymer becomes a rate-determining step. This is not favorable for the polymerization to proceed further. Such trouble will be eliminated by changing the solvent to another having less affinity to the polymer. For example according as the number of carbon atoms of hydrocarbon changes from large to small, the swelling property of polymer tends to decrease. In other words, hexane is better than octane, and pentane is better than hexane in providing a finely coagulated polymer.

In the practice of the present method, it is necessary to purify the solvent, monomer and the entire reaction system by eliminating moisture, oxygen and any other constituents harmful to the activity of catalyst.

On finishing the polymerization reaction, it is necessary to wash the resulting polymer to eliminate residual catalyst constituents with a medium containing water, alcohol such as methanol, ethanol, isopropanol, n-butanol, isobutanol, 2-ethylthexanol, glycol and the like, or mineral acid such as hydrochloric acid, ammonia or other aqueous alkaline solution, chelating agent capable of forming a complex with the catalyst, such as acetylacetone, acetoacetic ester. As for such after-treatment, well-known customary procedures used in the polymerization of ethylene or the copolymerzatiton of ethylene and other alpha-olefin in the presence of Ziegler-type catalyst can be applied without making any modification.

When ethylene or a monomer mixture consisting essentially of ethylene, e.g. a mixture consisting of more than 75 mol percent of ethylene, is polymerized by the present invention, a crystalline solid polymer having a high molecular weight is produced. Especially in the case of polyethylene, polymers have extremely few methyl radicals in the side chains, and are linear and homogeneous. In this point, the polyethylene produced by the present method is comparable to polyethylene produced by the Phillips method, Standard method or Ziegler method. In contrast with the polyethylene produced by the conventional methods having extremely wide molecular weight distribution, it is a characteristic point of the polyethylene produced by the present method that the distribution of molecular weight is exceedingly narrow. As an index of molecular weight distribution, the ratio of weight average molecular weight to number average molecular weight: $M_w/M_n$ is frequently used. This index for conventional polyethylene is in the range between 5 and 10, whereas it is in the range between 1.2 and 3, generally about 2, for the polyethylene produced according to the present method. The molecular weight distribution for conventional polymers, such as those obtained by the Ziegler method, generally shows good accord with Wesslau's distribution function, whereas the distribution for the polyethylene produced by the present method conforms to Tung's distribution formula. In this regard there is a remarkable difference between the two methods. Accordingly, the foregoing difference can be considered as evidence showing that the polymerization method according to the present method undergoes a novel mechanism substantially different from that of the Ziegler-type catalyst.

On account of the above-mentioned characteristic properties of polymers produced by the present method, there are differences to some extent in various other physical properties between the polyethylene produced by the present method and middle- or low-pressure polyethylenes.

First the polyethylene of the present invention is relatively difficult to crystallize. Therefore the polyethylene of the present invention has generally slightly smaller specific gravity. The specific gravity of middle-or low-pressure polyethylene is from 0.95 to 0.96, whereas that of the polyethylene of the present invention is from 0.93 to 0.95.

As already described the polyethylene of the present invention shows superiority in such properties as stress cracking, impact strength and low temperature characteristics. Table III shows various physical properties of the polyethylene of the present invention compared with those of the Ziegler method and those of the Phillips method, each having about the same molecular weight. Though the figures of brittle point do not show any difference, the tendency that polyethylene produced by the present method has the lowest brittle point was clearly observed.

These polymers have extremely high impact strength and are superior in many other mechanical properties. Furthermore it is possible to produce a polymer having any given molecular weight by the present method.

So far, in the manufacture of polyethylene by a middle- or low-pressure method, it is a customary practice to make ethylene copolymerize with some other alpha-olefins such as propylene or butene-1 to improve the disadvantageous properties such as anti-stress-cracking, elongation, softness and the like. In the method of present invention, it is possible to produce a crystalline polymer mainly consisting of ethylene having various improved properties when ethylene is polymerized in the co-existence of less than 25 mol percent, preferably less than 20 mol percent, of other alpha-olefins.

Polyethylenes or polymers mainly consisting of ethylene produced according to the present invention have superior properties in general molded articles, extruded articles, films and fibers, which can be used in various fields of application.

When the amount of alpha-olefins such as propylene and butene-1 added in the copolymerization is increased e.g. when the content of ethylene is less than 75 mol percent in total mixture, an amorphous polymer soluble in a solvent such as heptane is produced. In such instance, the properties of the polymer vary depending upon the constitution of monomer and the constitution of catalyst. When the amount of the compound of the general formula $R''SO_nY$ is relatively small, and that of ethylene is large, a relatively high molecular weight copolymer is produced. This copolymer is rich in rubber-like elasticity and has superior characteristic properties as rubber-like elastomers. Their cured products have extensive use of application. It is possible to produce vulcanizable products, like conventional natural rubber or synthetic rubber, incorporating diens or acetylenes in the polymerization thereby to introduce unsaturated radicals.

When the compound of the general formula $R''SO_nY$ is used abundantly or an alpha-olefin along with ethylene is used sufficiently, the molecular weight of the polymer is further reduced and a glass-like or water-glass-like, transparent, solid or semi-solid grease-like or liquid polymers are produced. These glass-like or water-glass-like transparent solid copolymers have not been known so well but due to their superior transparency together with other favorable properties, new fields of application are sure to be opened. Further, low polymers from grease-like to liquid can be used in fields similar to those of conventional polyisobutylene or other polyolefin hydrocarbons. They are superior in such various properties as saturation, transparency, stability, electrical properties, antihumidity and the like. For example, due to their high insulating property, low power factor, thermal stability and the like, they will find wide applications in electrical requisites such as impregnating oil for insulation, moisture proof sealing material, or the like, lubricant, compounding material for rubber, processing oil, wax, releasing agent or the like.

TABLE III.—PHYSICAL PROPERTIES OF VARIOUS POLYETHYLENE

| | $M_w/M_n$ | Density | Tensile test | | | Stiffness (kg./cm.²) | Brittle Point (° C.) | Vicat S.P. (° C.) | Mt. Pt. (° C.) | E.S. Cracking | |
| --- | --- | --- | --- | --- | --- | --- | --- | --- | --- | --- | --- |
| | | | Y.S. (kg./cm.²) | U.S. (kg./cm.²) | Elongation (percent) | | | | | a (hr.) | b (hr.) |
| Present method | 1.9 | 0.939 | 213 | 443 | 720 | 5,000 | <−73 | 129 | 141 | 6–22 | 30 |
| Phillips method | 8.8 | 0.96 | 256 | 385 | 930 | 6,600 | <−73 | 126 | 136 | 4 | 6–22 |
| Ziegler method | 6.0 | 0.949 | 233 | 320 | 950 | 6,200 | <−73 | 124 | 136 | 2 | 6–22 | a=Until cracking begins.
b=Until cracking completes.

NOTE—Y.S.: Yield strength; U.S.: Ultimate strength; Vicat S.P.: Vicat softening point; Mt. Pt.: Melting point; E.S. Cracking: Environmental stress cracking ($F_{50}$).

A further characteristic property of the present invention is to afford a polyethylene having an exceedingly high molecular weight. It is not difficult to realize such a super high molecular weight as from 1,000,000 to 3,000,000.

A more comprehensive understanding of the invention can be obtained by referring to the following illustrative examples which are not intended, however, to unduly limit the invention.

Example 1

A four necked flask having 2 l. content was flashed with nitrogen after application of vacuum and placed in a thermostat of 25° C. Nine hundred and eightly ml. of purified n-heptane was introduced into the flask. Ethylene was passed at a velocity of 3 l./min. to be dissolved by and saturated in the heptane. Then 10 mmol of ethylaluminum dichloride and 10 mmol of benzenesulfonyl chloride were added in this order. On adding 0.03 mmol of vanadium tetrachloride, and 20 ml. of heptane, a violent polymerization reaction started with a generation of heat, and the pressure of the reaction system decreased to subatmospheric pressure and a large amount of polyethylene was formed within a short period of time. Then by the same condition, expecting that a one-tenth amount i.e. 0.003 mmol, of vanadium tetrachloride was used, polymerization was repeated. After 10 minutes from the start of the reaction, the polymerization was stopped by introducing a mixture of methanol and hydrochloric acid. When the resulting polymer was washed sufficiently with a mixture of methanol and hydrochloric acid and then with methanol, followed by drying in vacuo, 16.3 g. of white polyethylene was obtained. Measuring its viscosity at a temperature of 120° C. by dissolving it in xylene an intrinsic viscosity of 10.7 was observed. When the polymerization was performed under the same conditions without adding benzenesulfonyl chloride, only 0.5 g. of polymer was obtained.

Example 2

Under the same condition as in Example 1, excepting that a catalyst system of 10 mmol of ethylaluminum sesquichloride, 10 mmol of benzenesulfonyl chloride and 0.003 mmol of vanadium tetrachloride was employed, the polymerization of ethylene was performed, whereby 4.5 g. of polyethylene was obtained in 10 minutes.

Example 3

Under the same conditions as in Example 1, excepting that a catalyst system of 10 mmol of diethylaluminum chloride, 10 mmol of benzenesulfonyl chloride and 0.0016 mmol of vanadyl trichloride and as a solvent 1 l. of benzene were used, the polymerization of ethylene was performed, whereby 11.4 g. of white polyethylene was obtained in 4 minutes.

Example 4

Under the same conditions as in Example 1, expecting that a catalyst system of 10 mmol of ethylaluminum dichloride, 10 mmol of benzenesulfonyl chloride and 0.0016 mmol of vanadyl trichloride and as a solvent 1 l. of carbon tetrachloride were used, the polymerization of ethylene was performed, whereby 6.6 g. of polyethylene was obtained in 4 minutes. Under the same conditions as in the foregoing case, excepting that chloroform was used instead of carbon tetrachloride, 6.5 g. of polymer was obtained.

Example 5

A stainless steel vessel having 2 l. content was flashed with nitrogen after applying vacuum, 1 l. of methylcyclohexane was charged and the temperature was raised to 50° C. While agitating the content at 600 revolutions per minute, the content of the vessel was substituted with a gaseous mixture of 50.5 percent by volume of hydrogen and 49.5 percent by volume of ethylene. After charging 10 mmol. of ethylaluminum dichloride and 10 mmol of benzenesulfonyl chloride the pressure of the content was raised up to 2 kg./cm.$^2$ by introducing the same gaseous mixture. Then a methylcyclohexane solution of 0.008 mmol of vanadium tetrachloride was added thereto. The reaction was continued for 30 minutes at a temperature of 50° C. while maintaining the constant pressure. After stopping the polymerization by use of a mixture of hydrochloric acid and methanol and, purifying with methanol, 28.1 g. of snow-white polyethylene dispersed in fine powder state was obtained. Measuring its viscosity at a temperature of 120° C. by dissolving it in xylene, an intrinsic viscosity of 1.9 was observed.

Example 6

After applying vacuum and flashing with nitrogen to an autoclave having 5 l. content, 3.5 l. of commercial heptane (containing 23 percent by weight of n-heptane) was charged therein and a gaseous mixture of ethylene and hydrogen containing 29.8 mol percent of hydrogen was blown into the heptane to saturate it. Then ethylaluminum dichloride, benzenesulfonyl bromide and vanadyl trichloride were added in this order to afford a concentration of 2.0, 2.0 and 0.0032 mmol/l. respectively. While passing the gas having above-mentioned composition at a rate of 3 l./min. the polymerization was performed for 2.5 hours by which 88.5 g. of polyethylene having an intrinsic viscosity of 2.53 was obtained.

Example 7

By the same procedure as in Example 1, excepting that a catalyst system of 2 mmol of ethylaluminum dichloride, 2 mmol of benzenesulfonyl chloride and 0.0032 mmol of vanadyl trichloride and as a solvent 1 l. of n-heptane were used, the polymerization of ethylene was performed for 30 minutes at a temperature of 25° C., whereby 16.5 g. of polyethylene having an intrinsic viscosity of 11.02 was obtained. By employing the same condition as in the above-mentioned excepting that gaseous mixtures each containing 50 mol percent and 80 mol percent nitrogen respectively were used, two kinds of polyethylene each having intrinsic viscosity of 6.13 and 2.81, respectively, were obtained. In these cases the state of particle dispersion of resulting polymers was improved. When ethane, methane, argon, helium or carbon dioxide was used instead of nitrogen as a diluent of ethylene, the same effect was observed.

Example 8

By the same procedure as in Example 7, excepting that n-pentane was used as a solvent, the polymerization of ethylene was performed at a temperature of 0° C. for 90 minutes, whereby 38.3 g. of polyethylene dispersed in fine powder state was obtained. Polymer yield per unit volume of solvent was higher than in the case of n-heptane. Further, by employing n-butane, the polymerization of ethylene was performed at a temperature of −30° C. and finely powdered polyethylene was obtained in good yield.

Example 9

By the same procedure as in Example 7 excepting that ethylene containing 50 mol percent nitrogen was employed and each catalyst constituent was respectively added continuously from individual separated inlets after 2 minutes from the start of polymerization reaction, the polymerization was continued for 52 minutes, whereby 33.2 g. of polyethylene having an intrinsic viscosity of 4.90 was obtained. It was thus confirmed that the sufficient activity of the catalyst could be maintained by supplying the catalyst constituents additionally, while the activity of the catalyst suddenly decreased within a short time of 10 to 20 minutes with no supplementation of the catalyst constituent.

Example 10

A four necked flask having 2 l. content was flashed with ethylene, charged with 1 l. of tetrachloroethylene and placed in a thermostat at a temperature of 25° C. After adding 20 mmol of ethylaluminum sesquibromide, 10 mmol of p-toluenesulfonyl chloride and 0.04 mmol of vanadium triacetylacetonate thereto, the polymerization of ethylene was performed for 5 minutes, whereby 4.7 g. of polymer was obtained. When dichlorovanadyl acetylacetonate was used instead of vanadium triacetylacetonate in the above-mentioned case, 13.9 g. of polymer was obtained in 10 minutes.

Example 11

By the same procedure as in Example 10 excepting that as a solvent 1 l. of n-heptane and as a catalyst 20 mmol of ethylaluminum dichloride, 5 mmol of p-chlorobenzenesulfonyl chloride, and 0.003 mmol of ethyl dichloroorthovanadate of the formula $VO(OEt)Cl_2$ were employed, the polymerization was performed for 10 minutes, whereby 6.5 g. of polyethylene was obtained.

Example 12

By the same procedure as in Example 10, excepting that as a catalyst 10 mmol of ethylaluminum dichloride, 10 mmol of thionyl chloride and 0.005 mmol of vanadium tetrachloride and as a solvent 1 l. of benzene were employed, ethylene was subjected to polymerization whereby 13.1 g. of polyethylene was produced in the reaction period of 5 minutes.

Example 13

After applying vacuum and flashing with nitrogen, a 4-necked flask having 2 l. content was charged with 1 l. of n-heptane and maintained at a temperature of 25° C. After passing a gaseous mixture containing 95 mol percent of ethylene and 5 mol per cent of propylene therethrough at a velocity of 3 l./minute for 4 minutes, 10 mmol of ethylaluminum dichloride, 10 mmol of benzenesulfonyl chloride and 0.003 mmol of vanadyl trichloride were added in this order thereto. After reacting for 10 minutes, a mixture of hydrochloric acid and methanol was added and the content was discharged. The resulting polymer was washed with a sufficient amount of methanol, followed by drying in vacuo, and whereby 13.2 g. of white solid polymer was obtained. Compared with polyethylene obtained by the same condition, it was confirmed that the stress cracking properties of this polymer was greatly improved. When the polymerization was performed under the same conditions as in the above-mentioned, excepting that benzenesulfonyl chloride was not added, the amount of resulting polymer was 0.6 g.

Example 14

By the same procedure as in Example 13, excepting that as a solvent benzene and as a catalyst 10 mmol of ethylaluminum dichloride, 10 mmol of benzenesulfonyl chloride and 0.005 mmol of vanadium tetrachloride were employed, the polymerization was performed while passing a gaseous mixture of 90 mol percent ethylene and 10 mol percent propylene, whereby 18.7 g. of white solid polymer was obtained after 6 minutes polymerization.

Example 15

By the same procedure as in Example 13, excepting that as a solvent carbon tetrachloride and as a catalyst 20 mmol of ethylaluminum sesquichloride, 0.4 mmol of benzenesulfonyl chloride, and 0.008 mmol of vanadium tetrachloride were employed, the polymerization was performed for 10 minutes, the composition of monomer used in gaseous state being 30 mol percent of propylene, and 70 mol percent of ethylene, whereby 12.2 g. of n-heptane-soluble amorphous polymer was obtained. The polymer was dissolved in xylene and viscosity of this solution was measured at a temperature of 120° C., by which an intrinsic viscosity of 3.5 was observed. From infrared absorption spectra, it was confirmed that the monomer contained 13 percent of propylene unit.

Example 16

By the same procedure as in Example 13, excepting that as a solvent 1 l. of benzene and as a catalyst 10 mmol of diethylaluminum chloride, 0.4 mmol of benzenesulfonyl chloride and 0.015 mmol of vanadyl trichloride were employed, the polymerization was performed at atmospheric pressure. The monomer was a gaseous mixture of 35 mol percent of ethylene and 65 mol percent of propylene. By the polymerization period of 10 minutes, 6.9 g. of n-heptane-soluble amorphous polymer was produced. It was observed that this polymer had an intrinsic viscosity of 2.3 and propylene unit content of 35 mol percent. When this polymer was cured by the system of dicumyl peroxide and sulfur, a rubber-like elastomer having superior properties was obtained.

Example 17

By the same procedure as in Example 13, excepting that as a solvent 1 l. of n-heptane and as a catalyst 20 mmol of ethylaluminum dichloride, 2 mmol of benzenesulfonyl chloride, and 0.02 mmol of vanadyl trichloride were employed, a gaseous mixture of 40 mol percent ethylene and 60 mol percent butene-1 was subjected to polymerization. By a reaction period of 10 minutes, 7.1 g. of polymer was obtained. The resulting polymer was a colorless lump having superior transparency and an intrinsic viscosity of 1.5.

Example 18

By the same procedure as in Example 13, excepting that as a solvent methyl cyclohexane and as a catalyst 20 mmol of ethylaluminum dichloride, 10 mmol of sulfuryl chloride and 0.02 mmol of vanadyl trichloride were employed, polymerization of a gaseous mixture of 30 mol percent of ethylene and 70 mol percent of propylene was performed. In 10 minutes, 27 g. of a liquid polymer having slightly yellowish orange color and high viscosity was obtained.

Example 19

By the same procedure as in Example 13, excepting that as a solvent, n-heptane and as a catalyst, 20 mmol of ethylaluminum dichloride, 10 mmol of chlorosulfonic acid and 0.2 mmol of vanadyl trichloride were employed, a mixed monomer of 20 mol percent of ethylene and 80 mol percent of propylene was subjected to polymerization. Due to violent polymerization, the reaction system was brought to a state of reduced pressure. By a reaction period of 4 minutes, 46 g. of oily polymer was obtained.

What is claimed is:

1. A method for producing a polymer of olefin selected from the group consisting of ethylene and a mixture of ethylene and an alpha-olefin having the general formula of $RCH=CH_2$ wherein R is a member selected from the group consisting of alkyl, aryl, aralkyl, alkylaryl and cycloalkyl radicals having carbon atoms of from 1 to 20, comprising contacting the said olefin selected from the group consisting of ethylene and a mixture of ethylene and an alpha-olefin having the general formula of $RCH=CH_2$ with a catalyst composition produced by admixing (A) at least one organoaluminum compound containing at least one halogen atom whose composition is represented by the general formula of $AlR'_mX_{3-m}$ wherein R' is a member selected from the group consisting of alkyl, aryl, aralkyl, alkylaryl and cycloalkyl radicals having carbon atoms of from 1 to 20, X is a halogen atom and $m$ is a number of from 1 to 2, (B) a compound of the general formula of $R''SO_nY$, wherein R'' is a member selected from the group consisting of halogen atoms, hydroxyl radical and hydrocarbon radicals of alkyl, aryl, aralkyl, alkylaryl and cycloalkyl radicals having carbon atoms of from 1 to 20, and their derivatives, Y is a halogen atom and $n$ is an integer selected from 1 and 2, and (C) a vanadium compound having at least one radical selected from the group consisting of halogen, alcoholate, acetylacetonate, salicylate, and cyclopentadienyl.

2. A method according to claim 1, in which a mixture of ethylene and an alpha-olefin contains less than 25 mol percent of alpha-olefin, thereby a solid crystalline polymer is produced.

3. A method according to claim 1, in which a mixture of ethylene and an alpha-olefin contains more than 25 mol percent of alpha-olefin, thereby an amorphous copolymer is produced.

4. A method according to claim 1, in which the alpha-olefin is a member selected from the group consisting of propylene and butene-1.

5. A method according to claim 1, in which the organoaluminum compound containing at least one halogen atom is a member selected from the group consisting of ethylaluminum dichloride, a mixture of ethylaluminum dichloride and diethylaluminum chloride, diethylaluminum chloride and a mixture of ethylaluminum dibromide and diethylaluminum bromide.

6. A method according to claim 1, in which the compound of the general formula of $R''SO_nY$ is a member selected from the group consisting of benzenesulfonyl chloride, p-methylbenzenesulfonyl chloride, p-chlorobenzenesulfonyl chloride, benzenesulfonyl bromide, thionyl chloride, sulfuryl chloride and chlorosulfonic acid.

7. A method according to claim 1, in which the vanadium compound is a member selected from the group consisting of vanadyl trichloride, vanadium tetrachloride, vanadium triacetylacetonate, dichloro-vanadyl acetylacetonate, ethyl dichloro-ortho-vanadate.

8. A method according to claim 1, in which the concentration of the organoaluminum compound containing at least one halogen atom is from 0.1 to 20 mmol per liter, the amount of the compound having the general formula of $R''SO_nY$ is from 0.001 to 20 mol per mol of the organoaluminum compound containing at least one halogen atom and the amount of the vanadium compound is from $10^{-6}$ to $10^{-1}$ mol per mol of the organoaluminum compound containing at least one halogen atom.

9. A method according to claim 8, in which the ratio of the organoaluminum compound containing at least one halogen atom vs. the compound of the general formula of $R''SO_nY$ is 1 mol:1 mol.

10. A method according to claim 1, in which the concentration of the vanadium compound is from $10^{-4}$ to $10^{-1}$ mmol per liter.

11. A method for producing a polymer of olefin selected from the group consisting ethylene and a mixture of ethylene and an alpha-olefin having the general formula of $RCH=CH_2$, wherein R is a member selected from the group consisting of alkyl, aryl, aralkyl alkylaryl and cycloalkyl radicals having carbon atoms of from 1 to 20, comprising contacting the said olefin with a catalyst system produced by admixing (A) at least one organoaluminum compound containing at least one halogen atom whose composition is represented by the general formula of $AlR'_mX_{3-m}$ wherein R' is a member selected from the group consisting of alkyl, aryl, aralkyl, alkylaryl and cycloalkyl radicals having carbon atoms of from 1 to 20, X is a halogen atom and m is a number of from 1 to 2, (B) a compound of general formula of $R''SO_nY$ wherein R'' is a member selected from the group consisting of halogen atoms, hydroxyl radical and hydrocarbon radicals of alkyl, aryl, aralkyl, alkylaryl, cycloalkyl radicals containing carbon atoms of from 1 to 20, Y is a halogen atom and n is an integer selected from 1 to 2 and (C) a vanadium compound having at least one radical selected from the group consisting of halogen, alcoholate, acetylacetonate, salicylate, and cyclopentadienyl, in the presence of an inert solvent selected from the group consisting of hydrocarbons and halogenated hydrocarbons.

12. A method for producing a polymer of olefin selected from the group consisting of ethylene and a mixture of ethylene and an alpha-olefin having the general formula of $RCH=CH_2$, wherein R is a member selected from the group consisting of alkyl, aryl, aralkyl, alkylaryl and cycloalkyl radicals having carbon atoms of from 1 to 20, comprising contacting the said olefin mixed with a gas selected from the group consisting of hydrogen, nitrogen, ethane, methane, argon, helium, and carbon dioxide with a catalytic system produced by admixing (A) at least one organoaluminum compound containing at least one halogen atom whose composition is represented by the general formula of $AlR'_mX_{3-m}$ wherein R' is a member selected from the group consisting of alkyl, aryl, aralkyl alkylaryl and cycloalkyl radicals having carbon atoms of from 1 to 20, X is a halogen atom and m is a number of from 1 to 2, (B) a compound of the general formula of $R''SO_nY$ wherein R'' is a member selected from the group consisting of halogen atoms, hydroxyl radical and hydrocarbon radicals of alkyl, aryl, aralkyl, alkylaryl, cycloalkyl radicals containing carbon atoms of from 1 to 20, Y is a halogen atom and n is an integer selected from 1 to 2 and (C) a vanadium compound having at least one radical selected from the group consisting of halogen, alcoholate, acetylacetonate, silicylate, and cyclopentadienyl.

13. A method according to claim 11, in which the inert solvent is a hydrocarbon having carbon atoms of not larger than 8.

14. A method according to claim 11, in which at least one catalyst constituent is introduced into the reaction system continuously.

15. A method according to claim 11, in which the contact of the said olefin with the catalyst system is effected at a temperature of from $-78°$ C. to $70°$ C.

No references cited.

JOSEPH L. SCHOFER, *Primary Examiner.*

M. KURTZMAN, *Assistant Examiner.*